(12) United States Patent
Reisbick

(10) Patent No.: US 11,637,439 B2
(45) Date of Patent: Apr. 25, 2023

(54) INTELLIGENT BATTERY CONTROLLER

(71) Applicant: DISH Wireless L.L.C., Englewood, CO (US)

(72) Inventor: Richard Reisbick, Westminster, CO (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 17/215,889

(22) Filed: Mar. 29, 2021

(65) Prior Publication Data

US 2021/0320511 A1 Oct. 14, 2021

Related U.S. Application Data

(60) Provisional application No. 63/009,659, filed on Apr. 14, 2020.

(51) Int. Cl.
  *H02J 7/00* (2006.01)
  *H02J 7/35* (2006.01)
(52) U.S. Cl.
  CPC ........ *H02J 7/0068* (2013.01); *H02J 7/00032* (2020.01); *H02J 7/0063* (2013.01); *H02J 7/35* (2013.01)
(58) Field of Classification Search
  CPC .................................................... H02J 7/0068
  See application file for complete search history.

(56) References Cited

U.S. PATENT DOCUMENTS

| 6,470,358 | B1 * | 10/2002 | Beyda | G06F 16/178 |
| 6,914,411 | B2 * | 7/2005 | Couch | H02J 7/35 |
| | | | | 320/101 |
| 7,830,038 | B2 * | 11/2010 | Wang | H02J 3/38 |
| | | | | 307/64 |

(Continued)

FOREIGN PATENT DOCUMENTS

| GB | 2577387 A | * | 3/2020 | ........ H01M 10/4257 |
| JP | 2019110635 A | * | 7/2019 | |

OTHER PUBLICATIONS

Martin Woolley, "Bluetooth Core Specifications Version 5.4 Feature Enhancements", Jun. 24, 2021. Availabe at https://www.bluetooth.com/bluetooth-resources/bluetooth-core-specification-version-5-3-feature-enhancements/ (Year: 2021).*

*Primary Examiner* — Adi Amrany
(74) *Attorney, Agent, or Firm* — Kilpatrick Townsend & Stockton, LLP

(57) ABSTRACT

Various arrangements of intelligent battery controller devices are presented herein. A intelligent battery controller device can include a power input interface that receives power from a power source for charging a battery and a power output interface that outputs power from the battery. The intelligent battery controller device can include a power monitor and control system that monitors: an output power output by the battery to one or more external devices via the power output interface; and an input power received by the battery via the power input interface. Based on the output power and the input power, the intelligent battery controller device may determine a power level of a plurality of predefined power levels. A power level message can be transmitted to an external device that receives power from the intelligent battery controller device.

9 Claims, 7 Drawing Sheets

(56) References Cited

U.S. PATENT DOCUMENTS

| | | | | |
|---|---|---|---|---|
| 8,217,619 B2* | 7/2012 | Sander | | H02J 7/007182 |
| | | | | 320/101 |
| 8,378,622 B2* | 2/2013 | Yang | | H02J 7/0068 |
| | | | | 320/132 |
| 9,098,278 B1* | 8/2015 | Nay | | G06F 1/30 |
| 9,893,544 B2* | 2/2018 | Chan | | H02J 50/001 |
| 9,954,360 B2* | 4/2018 | Belschner | | H02J 3/381 |
| 11,205,994 B2* | 12/2021 | Takahashi | | G01R 19/16566 |
| 2001/0043050 A1* | 11/2001 | Fisher, Jr. | | H02J 7/35 |
| | | | | 320/101 |
| 2008/0084178 A1* | 4/2008 | Dowd | | H01M 10/42 |
| | | | | 320/101 |
| 2009/0086520 A1* | 4/2009 | Nishimura | | H02J 3/386 |
| | | | | 363/133 |
| 2011/0218692 A1* | 9/2011 | Li | | G05F 1/66 |
| | | | | 700/297 |
| 2011/0304295 A1* | 12/2011 | McNally | | H02J 7/34 |
| | | | | 320/101 |
| 2012/0143383 A1* | 6/2012 | Cooperrider | | H02J 13/00034 |
| | | | | 700/295 |
| 2013/0064136 A1* | 3/2013 | Apostolakis | | H04W 88/16 |
| | | | | 370/254 |
| 2015/0074365 A1* | 3/2015 | Uehara | | G06F 1/263 |
| | | | | 711/162 |
| 2015/0077127 A1* | 3/2015 | Fu | | G06F 1/3212 |
| | | | | 324/428 |
| 2016/0036098 A1* | 2/2016 | Washiro | | H01M 10/486 |
| | | | | 429/61 |
| 2016/0219664 A1* | 7/2016 | Ellenberger | | H02J 7/0021 |
| 2019/0013766 A1* | 1/2019 | Stach | | H02S 10/40 |
| 2019/0013768 A1* | 1/2019 | Levin | | H02S 30/10 |
| 2019/0199104 A1* | 6/2019 | Shim | | H02J 7/0063 |
| 2019/0332154 A1* | 10/2019 | Thompson | | G06F 1/3246 |
| 2020/0052519 A1* | 2/2020 | Thompson | | H02J 7/0071 |
| 2021/0281103 A1* | 9/2021 | Williams | | H02J 3/381 |

* cited by examiner

INTELLIGENT BATTERY CONTROLLER

CROSS REFERENCES TO RELATED APPLICATIONS

This application claim priority to U.S. Provisional Patent Application No. 63/009,659, filed on Apr. 14, 2020, entitled "Intelligent Battery Controller", the entire disclosure of which is hereby incorporated by reference for all purposes.

BACKGROUND

In locations where a reliable source of power is not continuously available, a battery may be used to power a device. Typically, a battery may power a device until the battery runs low on charge and its voltage level drops. The battery may then cease outputting power and the device may experience a sudden power loss. For electronics, such an arrangement may not be ideal, especially if the electronics perform one or more important functions.

SUMMARY

Various embodiments are described related to an intelligent battery controller device. In some embodiments, an intelligent battery controller device is described. The device may comprise a housing. The device may comprise a power input interface that may receive power from a power source for storage in a battery. The device may comprise a power output interface that may output power from the battery. The device may comprise a wireless communication interface that may be housed by the housing. The device may comprise a power monitor and control system that may monitor: 1) an output power output by the battery to one or more external devices via the power output interface; and 2) an input power received by the battery via the power input interface, the power output monitor housed by the housing. The device may comprise a processing system in communication with the power monitor and control system. The processing system may be configured to, based on the output power and the input power, determine a power level of a plurality of predefined power levels. The processing system may be configured to, in response to determining the power level, cause the wireless communication interface to transmit a power level message to an external device that receives power from the intelligent battery controller device.

Embodiments of such a device may include one or more of the following features: the plurality of predefined power levels may comprise: a first power level being indicative of power ceasing to be output after a predefined period of time; and a second power level indicative of a greater amount of power being received at the power input interface than is being output via the power output interface. The plurality of predefined power levels further may comprise a third power level indicative of the intelligent battery controller device being able to maintain the output power for a first defined duration of time. The plurality of predefined power levels further may comprise a fourth power level indicative of the intelligent battery controller device being able to maintain the output power for a second defined duration of time, the second duration of time being longer than the first duration of time. The power input may receive a direct current from a solar panel system. The power input may receive an alternating current from a lighting system that may not be continuously powered. The device may further comprise a battery profile stored to a non-transitory processor-readable medium that may define operating parameters for the battery. The processing system may control a duty cycle of a square wave for charging of the battery based on the battery profile. The wireless communication interface may be BLUETOOTH® and the power level message may be encrypted.

In some embodiments, an intelligent battery controller system is described. The system may comprise a gateway device that provides network access to a plurality of devices. The system may comprise a battery. The system may comprise an intelligent battery controller device distinct from the battery, that may comprise a housing. The device may comprise a power input that receives power from a power source and stores the power in a battery. The device may comprise a direct current power output that outputs power from the battery. The device may comprise a wireless communication interface housed by the housing. The device may comprise a power monitor and control system that monitors: 1) an output power output by the battery to the gateway device via the direct current power output; and 2) an input power received by the battery via the power input, the power output monitor housed by the housing. The device may comprise a processing system in communication with the power monitor and control system. The processing system may be configured to: based on the output power and the input power, determine a power level of a plurality of predefined power levels. The processing system may be configured to cause the wireless communication interface to transmit a power level message to the gateway device.

Embodiments of such a device may include one or more of the following features: the plurality of predefined power levels may comprise: a first power level being indicative of power ceasing to be output after a predefined period of time; and a second power level indicative of a greater amount of power being received at the power input interface than is being output via the power output interface. The plurality of predefined power levels further may comprise a third power level indicative of the intelligent battery controller device being able to maintain the output power for a first defined duration of time. The plurality of predefined power levels further may comprise a fourth power level indicative of the intelligent battery controller device being able to maintain the output power for a second defined duration of time, the second duration of time being longer than the first duration of time. The gateway device may be further configured to disable one or more functions to decrease power consumption in response to the power level message being indicative of the third power level. The gateway device may be further configured to determine to maintain current power consumption of the gateway device in response the power level message being indicative of the third power level. The device may further comprise a maximum power point tracker (MPPT) to charge the battery.

In some embodiments, a method for performing intelligent battery control is described. The method may comprise monitoring an input amount of power supplied by a power source to a battery. The method may comprise monitoring an output amount of power output by the battery to one or more external devices. The method may comprise, based on the output amount of power and the input amount of power, determining a power level of a plurality of predefined power levels. The method may comprise transmitting a wireless power level message comprising an indication of the power level.

Embodiments of such a method may include one or more of the following features: the power level may be indicative of a power shutdown event for the one or more external devices after a predefined period of time; the method further comprising: performing, by an external device, an action to prepare for the shutdown event after the predefined period of time. The method further may comprise decreasing, by the external device, power consumption in response to the wireless power level message. The method may further comprise determining, by an external device, based on one or more factors, whether to decrease power consumption in response to the wireless power level message. The method may further comprise in response to determining, disabling, by the external device, one or more functions of the external device. The wireless power level message may be encrypted and the plurality of predefined power levels may comprise at least seven power levels.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

An intelligent battery controller can control and monitor battery charging and discharge. Based on monitoring battery charging, the intelligent battery controller can provide an external device with information that informs the external device of when the power output by the battery will cease and/or the opportunity for the external device to decrease its power usage to prolong the battery's charge. Therefore, rather than an external device receiving a sudden cessation in supplied power, the external device can plan for when power will cease to be available or take proactive steps to decrease power consumption.

The intelligent battery controller may be connected with various forms of power sources, which may be alternating current or direct current. For instance, the intelligent battery controller may be connected with solar panels (which only generate power when receiving light) that output a direct current or an intermittent power source, such as lighting system dedicated wiring that is only powered on when the lighting needs to be illuminated (such as lighting for a parking lot) that outputs an alternating current. The intelligent battery controller may control charging of the battery, can monitor how quickly the stored charge of the battery is being depleted, and can communicate with one or more external devices being powered by the battery and inform them of actions that are being taken by the intelligent battery controller or optional actions that can be performed by the external device to prolong battery life.

Figure 1:
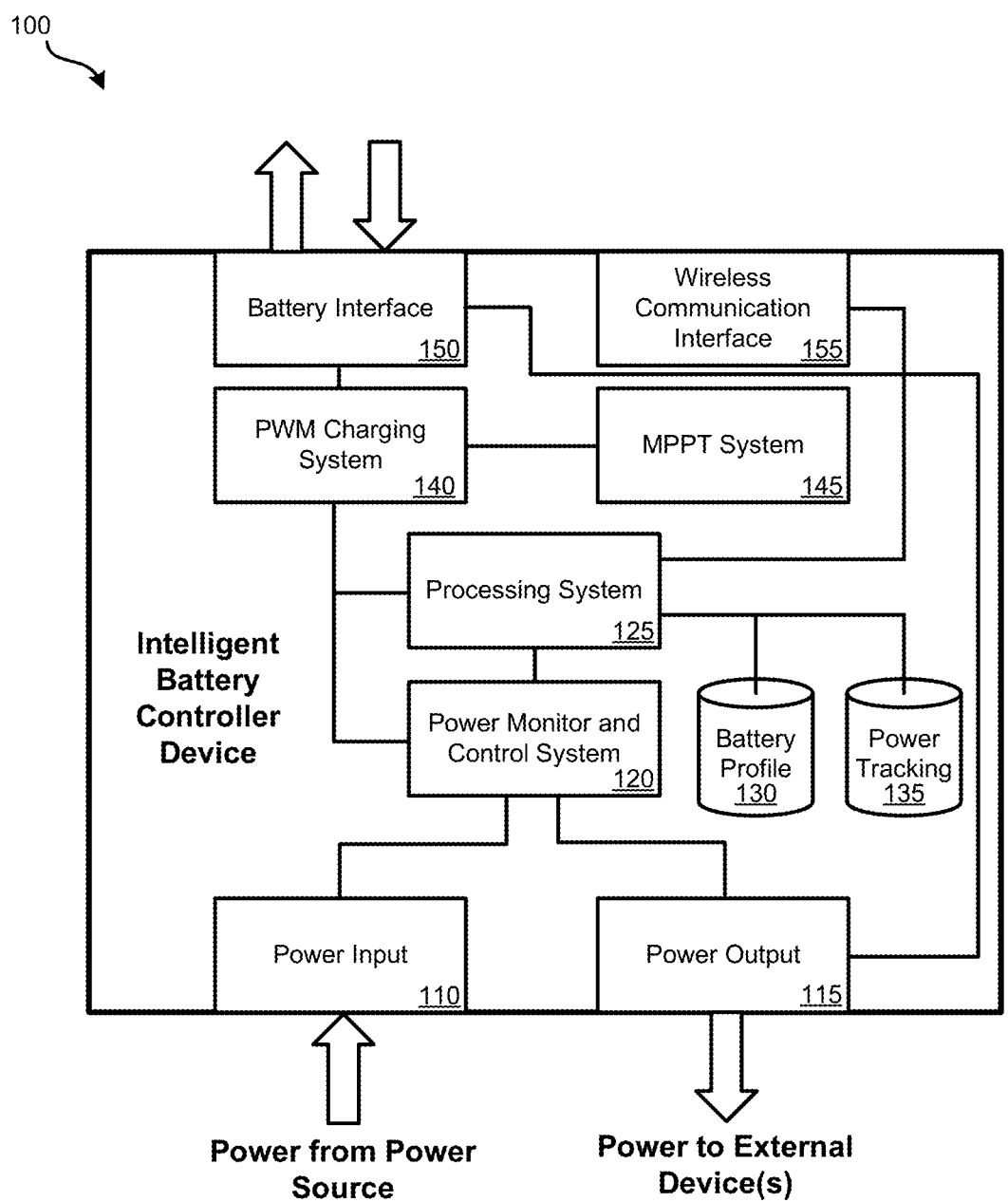
FIG. 1 illustrates an embodiment of an intelligent battery controller.

FIG. 1 illustrates an embodiment of an intelligent battery controller device 100. Intelligent battery controller device 100 can include: power input 110; power output 115; power monitor and control system 120 ("PMCS 120"); processing system 125; battery profile 130; power tracking database 135; PWM (pulse width modulation) charging system 140; MPPT (maximum power point tracking) system 145; battery interface 150; and wireless communication interface 155. Intelligent battery controller device 100 can include a housing that houses all of the components of intelligent battery controller device 100. For instance, the housing may be a rigid case that is distinct from the battery. In some embodiments, the battery may be housed with the housing.

Power input 110 can receive power from a power source. The power source can be intermittent. For example, the power source may be a solar panel. The amount of power supplied by the solar panel may be dependent on how sunny it is. Further, no power may be generated by solar panels at night. Another example of a power source may be an intermittent connection to a continuous power supply. For example, power input 110 may be connected with a lighting circuit. The lighting circuit may only be energized when one or more lights are to be lit. For instance, in a parking lot, many lights may be connected with a same circuit that is only energized when it is dark outside. Therefore, in such an arrangement, power input 110 may only receive power when it is dark outside. In some embodiments, multiple power sources may be paired together, such as a solar panel and an intermittent connection to a continuous power source, to provide power input 110 with power more frequently.

In some embodiments, the battery with which intelligent battery controller device 100 is connected is intended to serve as an uninterrupted power supply. Therefore, power input 110 may be connected with a continuous power source, such as an electrical grid, that is usually available, but is occasionally unavailable. The power received by power input 110 may be direct current (DC) that varies in voltage (e.g., due to the temperature and amount of light incident on the solar panels). If the power supplied is alternating current (AC), an AC-to-DC converter may be incorporated as part of intelligent battery controller device 100 or may be external and connected with power input 110. Power input 110 may be able to accommodate a large range of voltages. For instance, an input of between 5 V and 24 V may be accommodated by power input 110.

Power output 115 may output power from power input 110, the battery connected with battery interface 150, or both to one or more external devices that require power. The amount of power output via power output 115 and the amount of power input in power input 110 may be measured by PMCS 120. In some embodiments, in alternative to or in addition to monitoring the amount of power input via power input 110, PMCS 120 may monitor the voltage of the battery connected with battery interface 150 to determine the battery's charge level. PMCS 120 may measure the net amount of power being delivered to or taken from the battery connected with battery interface 150 and provide such data to processing system 125.

Battery interface 150 may be configured to be electrically connected with one or more external batteries. Different sizes and types of batteries can be connected with battery interface 150 and an appropriate battery profile can be loaded into battery profile 130. For simplicity, the described embodiments assume that a single battery is connected with battery interface 150; however, a greater number of batteries may be connected with battery interface 150 to increase storage capacity. The number and/or capacity of batteries attached with battery interface 150 may be selected based on the number and power consumption of the external devices connected with power output 115. Further, the number and/or capacity of batteries attached with battery interface 150 may be dependent on the amount of time that the batteries are needed to serve as the power source for power output 115. For example, if the batteries are only intended to serve as a supply of power during brief power outages, the number and/or capacity of the batteries may be relatively small compared to if the batteries are intended to serve as a power supply each night while solar panels connected with power input 110 are not generating any significant amount of power.

Processing system 125 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Processing system 125, based on data received from PMCS 120, can track to power tracking database 135 the net inflow and output of power to the battery connected with battery interface 150. Data indicative of the amount of power stored and used may be tracked using power tracking database 135. Processing system 125 may compute the amount of time which the external devices can function at current and/or average power usage rates. For instance, an average amount of power used by the external devices over a rolling time period (such as between the last five minutes and the last ten hours) may be tracked and/or an instantaneous amount of power being used by the external devices may be tracked.

PWM charging system 140 may create and control the duty cycle of a square wave used to charge the battery connected with battery interface 150. PWM charging system 140 may set the pulse width based on an instruction from processing system 125. Processing system 125 may have access to battery profile 130. Battery profile 130, which can be stored using a non-transitory processor-readable medium, stores parameter data specific to the battery (or batteries) connected with battery interface 150. Battery profile 130 may define: a maximum and/or minimum duty cycle for charging the battery; a maximum charging current; a maximum discharge current; and/or a voltage range or specific voltage for charging; etc. Processing system 125 may control charging and discharging of the battery based on the parameters of battery profile 130. Battery profile 130 may further define the charge capacity of the battery, thus allowing processing system 125 to determine how much power can be stored and is available for output. Battery profile 130 may also indicate a voltage at which power is to be ceased being output. Battery profile 130 may also indicate a charge time and a remaining charge capacity. The remaining charge capacity may be a percentage that indicates how the battery's performance has degraded over time. For example, after 100 charge and discharge cycles, a battery may only maintain 90% of its charge capacity.

PWM charging system 140, by adjusting the duty cycle of the square wave used to charge the battery, can also be used to prevent components of intelligent battery controller device 100 from overheating. For instance, the charging circuit may overheat if a 100% duty cycle is used. The duty cycle may be decreased to 80% to prevent overheating.

MPPT system 145 may optimize the voltage used to charge the battery connected with battery interface 150. MPPT system 145 may function as a DC to DC converter to optimize the charging of the battery based on the input power received by power input 110. MPPT system 145 analyzes the power being received by power input 110 and the current voltage of the battery connected with battery interface 150. MPPT system 145 determines the most appropriate voltage to be used to supply the most current to the battery for charging. Therefore, MPPT system 145 helps to optimize charging of the battery based on whatever voltage is provided to power input 110.

Wireless communication interface 155 can be used to communicate with one or more external devices. Processing system 125 can communicate with one or more external devices by transmitting wireless messages via wireless communication interface 155. Wireless communication interface 155 may allow for direct wireless communications (without the need for a network hub). Wireless communication interface 155 may use BLUETOOTH®, such as BLUETOOTH® Low Energy (BLE), to communicate with one or more external devices that receive power via power output 115. Other forms of wireless communication may be used, such as a wireless mesh networking communication protocol, such as THREAD®. Wireless communication can also be performed using network-based communication protocols, such as the IEEE 802.11 communication protocols. In other embodiments, a wired communication arrangement may be used in addition or instead of the wireless communication protocol. Wireless communication interface 155 may use encrypted communications to prevent an unauthorized device from hijacking communications between the intelligent battery controller device 100 and the one or more external devices.

Processing system 125 may communicate with one or more of the external devices receiving power via power output 115. Based on monitoring the inflow and outflow of power to the battery connected with battery interface 150, processing system 125 may determine a time when power will cease being provided via power output 115. An indication that power will no longer be output and an indication of the time when power will cease being output may be transmitted via wireless communication interface 155. Processing system 125 may compute the time based on: parameters of the battery stored in battery profile 130 and the inflows and outflows of power tracked in power tracking database 135.

Processing system 125 may also output a power decision request via wireless communication interface 155. A power decision request can allow an external device to select whether: 1) to continue operating at a current power level and expect power to cease being provided at a provided time; or 2) to decrease the amount of power being consumed by the one or more external devices in order for power to be continued to be provided until a second provided time (or indefinitely). Option two may also indicate the power level that the one or more external devices cannot exceed in order to realize power being provided until the second provided time. In other embodiments, multiple options may be provided such as various times of when power will cease being provided based on different power consumption levels. The one or more external devices can evaluate the options and decide whether to modify their power usage in order to extend the battery life.

In response to the power decision request, processing system 125 may, via wireless communication interface 155, receive an acknowledgement of the request. Whether the one or more external devices actually reduce power consumption is left to the external devices. Regardless, processing system 125 may continue to transmit indications of when power will cease being output by intelligent battery controller device 100. As the time grows closer, updates may be transmitted via wireless communication interface 155 that tend to have increased accuracy of when the power will cease being output.

Processing system 125 may also output a power reduction message via wireless communication interface 155. Unlike the power decision request, a power reduction message is an instruction to one or more external devices indicating a power consumption level with which the external device is required to adhere.

Alternatively, in some embodiments, processing system 125 may not provide a power decision request or a power reduction message. Rather, processing system 125 may output, via wireless communication interface 155, periodic or occasional power level status messages. The power level status messages may be interpreted by the one or more external devices, which can in turn determine how best to manage power based on the most recent power level status message.

Figure 7:
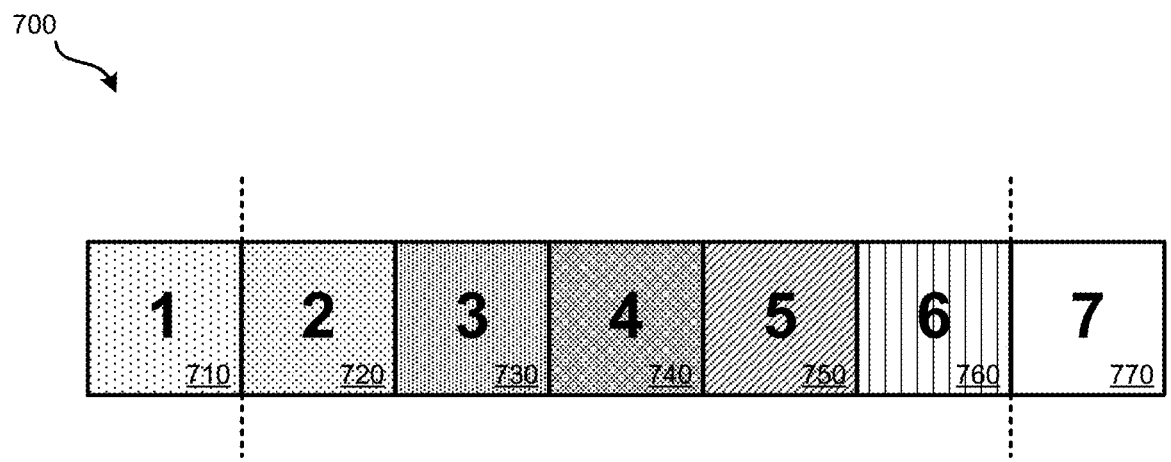
FIG. 7 illustrates a power level status range.

In some embodiments, the power level status is determined by processing system 125 on a scale of 1-7. FIG. 7 illustrates a power level status range 700. Intelligent battery controller device 100 may use such a scale of multiple predefined power levels to output an indication of how long it anticipates it will be able to continue supplying power based on the current (or average) power draw. The one or more external devices receiving an indication of the power level status can assess the power level status and decide how best to handle power management.

Power level 710 indicates that a decision has been made by intelligent battery controller device 100 to power down. When power level 710 is entered, intelligent battery controller device 100 may have determine that the battery or batteries can only continue to supply power for a predefined period of time, such as 30 seconds, before the voltage level drops below a threshold or intelligent battery controller device 100 is going to actively shutdown or otherwise deactivate the power output interface. When external devices receive an indication of power level 710, the external devices can begin an orderly shutdown of processes that can be accomplished within the predefined period of time. Such an orderly shutdown process can help prevent any executing processes from being halted at a time at which, for example, data corruption could occur (e.g., during a write operation). Once power level 710 has been communicated to the one or more external devices, the external devices can expect to lose power once the predefined period of time is over. Intelligent battery controller device 100 may monitor the power output to power input ratio to determine when power level 710 should be set such that power can continue being output for the predefined period of time before power needs to be ceased being output by intelligent battery controller device 100. For example, if the external devices have a heavy power draw, power level 710 may be entered sooner than if the external devices have a relatively lower power draw such that the power output needs can be met for at least the predefined period of time in either scenario.

Power level 770 may indicate that a greater amount of power is being received at power input 110 than is being output at power output 115. Therefore, power can continued to be supplied indefinitely at the current power usage level of the one or more external devices. In response to receiving an indication of power level 770, the one or more devices may function such that no processes are limited due to power constraints. Power level 770 may be output by intelligent battery controller device 100 when intelligent battery controller device 100 is connected with active line power or solar panels are generating a large amount of power.

Power level 720, power level 730, power level 740, power level 750, and power level 760 may each indicate power levels at which the current power being output can be maintained for a defined duration of time but that the amount of power being output by intelligent battery controller device 100 to power the one or more external devices exceeds the amount of power being received by intelligent battery controller device 100 to charge the one or more batteries. Power level 720 can be indicative that if the current input to output power ratio remains the same, intelligent battery controller device 100 will enter power level 710, which will necessitate shutdown. Power level 730 may be indicative that the amount of time for which the current power output to input ratio can be maintained is longer than with power level 720. Over time, if the amount of power output by intelligent battery controller device 100 continues to exceed the amount of input to intelligent battery controller device 100, a transition from power level 760, to power level 750, to power level 740, to power level 730, and to power level 720 can be expected.

In some embodiments, a predefined amount of time is mapped to each power level. For example, power level 720 may indicate that the intelligent battery controller device 100 can maintain the current ration of power output to power input for 5 minutes; power level 730 may indicate that the intelligent battery controller device 100 can maintain the current ration of power output to power input for 15 minutes; and power level 740 may indicate that the intelligent battery controller device 100 can maintain the current ration of power output to power input for 1 hour; and so on. External devices may have stored a mapping of these predefined amounts of times with power levels.

The one or more devices may be configured to power down accessories or processes in response to power levels 720-760. Since power level 720 is indicative of the current power output to input ratio only being able to be maintained for a short period of time, one or more external devices may shut down a greater number of accessories or processes than in response to a higher numbered power level.

In some embodiments, intelligent battery controller device 100 may estimate a time when it will receive a significant amount of input power and transition to power level 7. For instance, if connected with lighting system wiring that is not powered continuously, such as only powered between sunset and sunrise, intelligent battery controller device 100 may have information stored that indicates when the power will likely be activated. If intelligent battery controller device 100 estimates it has enough power to maintain the current power output level until the transition, intelligent battery controller device 100 may continue to output an indication of power level 7, despite the battery being actively depleted.

In the example of FIG. 7, seven power levels are illustrated. In other embodiments, a different number of power levels may be used, either greater or fewer. In still other embodiments, rather than indicating a power level, an indication of an estimated duration of charge remaining may be output based on current power usage or an average over a rolling window of time.

Processing System 125 can cause intelligent battery controller device 100 to charge in multiple distinct operational modes. Intelligent battery controller device 100 can be in: idle mode; trickle charge mode; full charge mode; or bypass mode. In idle mode, no charging may be performed. In trickle charge mode, the battery may be charged at a very low rate, such as when the battery is already fully charged or nearly fully charged and a small amount of current is required to compensate for power being output via power output 115. In full charge mode, the battery may be charged at a high rate, such as when the battery is significantly discharged. In bypass mode, power received via power input 110 may be converted to the appropriate voltage and output via power output 115 without involving the battery connected with battery interface 150. Such an arrangement may be beneficial when the battery is fully charged and is not needed for powering the one or more external devices.

Figure 2:
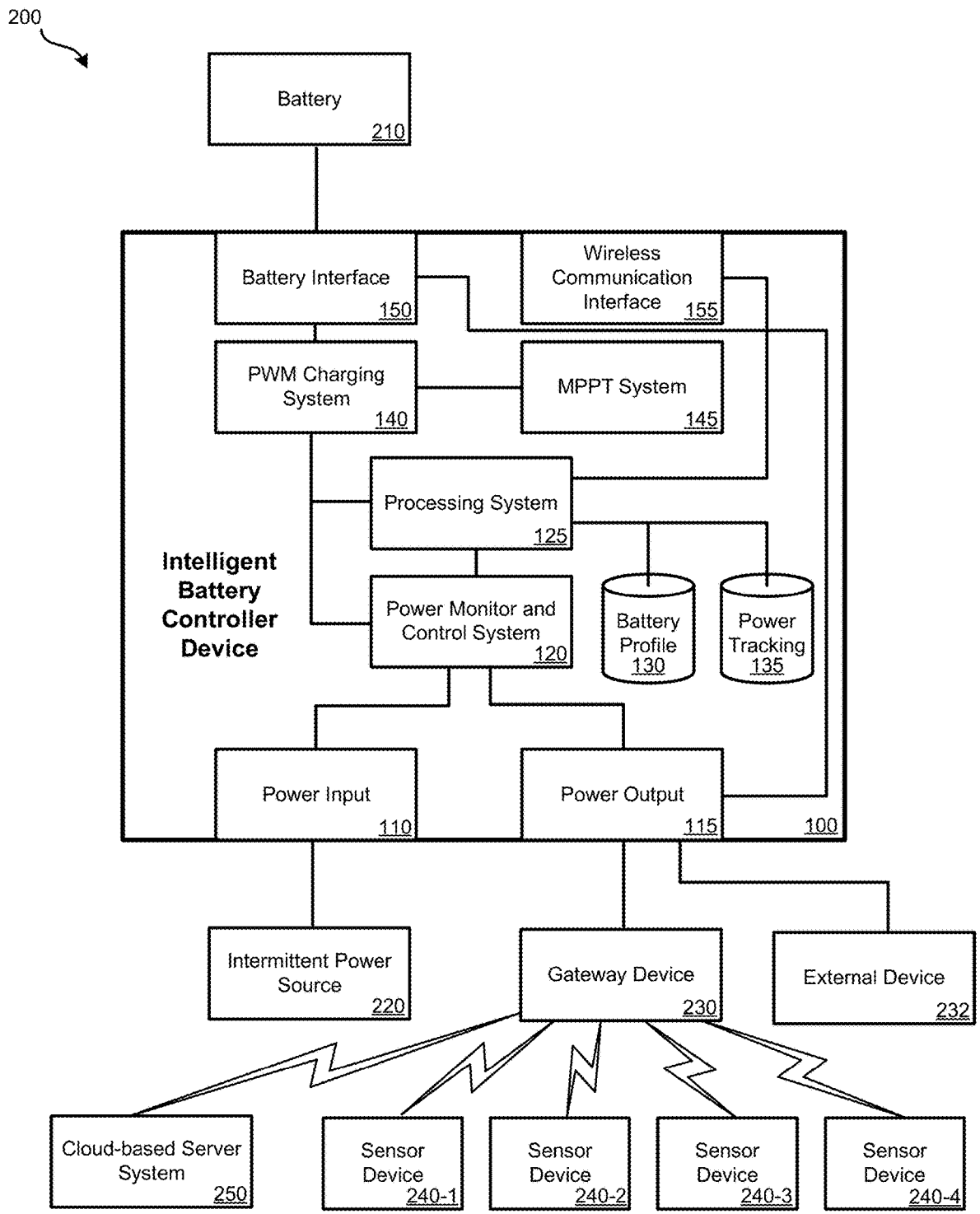
FIG. 2 illustrates an embodiment of an intelligent battery controller system.

FIG. 2 illustrates an embodiment of an intelligent battery controller system 200 ("system 200"). In system 200, intelligent battery controller device 100 functions in concert with multiple other devices. System 200 can include: intelligent battery controller device 100; battery 210; intermittent power source 220; gateway device 230; external device 232; sensor devices 240; and cloud-based server system 250.

Battery 210 may be selected based on the particular capacity and size needs for the external devices connected with power output 115. The battery profile loaded into battery profile 130 may indicate the particular parameters of battery 210. Intermittent power source 220 can represent the power source which occasionally provides power to charge battery 210. For instance, intermittent power source 220 can be solar panels, a circuit that is occasionally powered, or a continuous power source that may occasionally be unavailable.

Gateway device 230 can represent a type of external device that may receive power from power output 115 of intelligent battery controller device 100. Gateway device 230 may serve as a gateway between various electronic devices and one or more networks. For example, sensor devices 240 may communicate with gateway device 230. Processing for sensor devices 240 may be performed at gateway device 230. Additionally, gateway device 230 may communicate with one or more cloud-based systems via one or more wireless or wired communication protocols. For instance, gateway device 230 may communicate with a 4G LTE or 5G NR cellular network, thus allowing sensor devices 240 to communicate with one or more cloud-based systems, such as cloud-based server system 250. When intelligent battery controller device 100 provides an indication of when power is going to cease being available to gateway device 230, of a power decision needed to be made by gateway device 230, or of an instruction to reduce power consumption, gateway device 230 may send an indication of the message to cloud-based server system 250. In some embodiments, this arrangement is to keep cloud-based server system 250 appraised of when gateway device 230 will go offline; in other embodiments, the decision of whether to reduce power usage at gateway device 230 (and by how much) may be made by cloud-based server system 250.

Instead of or in addition to gateway device 230, some other external device 232 may receive power from battery 210 via intelligent battery controller device 100. External device 232 may or may not be able to communicate with wireless communication interface 155. While FIG. 2 illustrates two devices receiving power from intelligent battery controller device 100, greater or fewer numbers of devices are possible.

Figure 3:
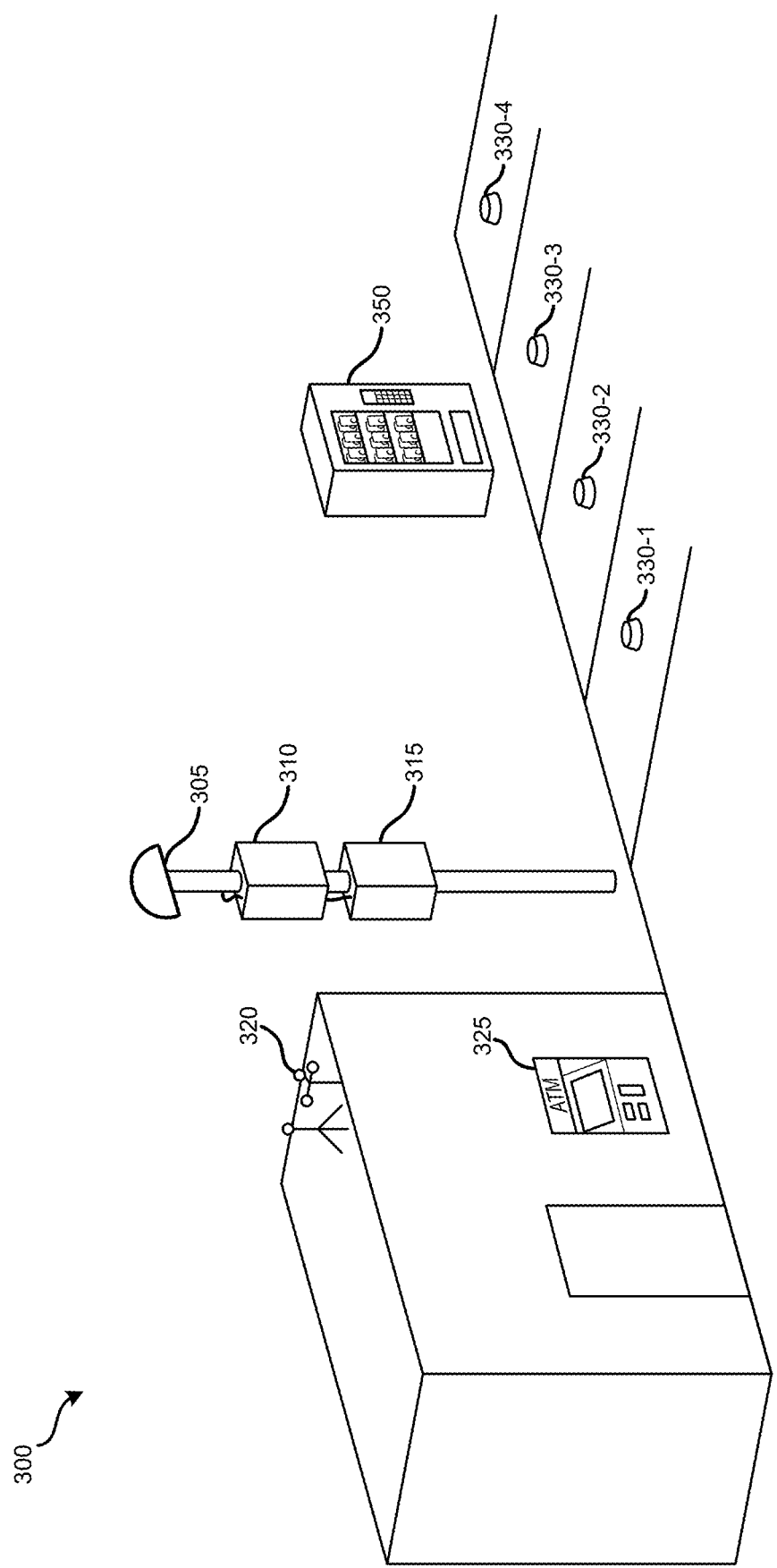
FIG. 3 illustrates an environment in which an intelligent battery controller system may be used.

FIG. 3 illustrates an environment 300 in which an intelligent battery controller system may be used, such as intelligent battery controller system 200 of FIG. 2. In environment 300, multiple sensor devices 330 (330-1, 330-2, 330-3, 330-4) are present. Sensor devices 330 may be parking sensors, which each can determine whether a vehicle is present in the parking space in which the particular parking sensor is located, such as by using magnetometer measurements. Sensor devices 330 may communicate wirelessly with gateway device 315 to provide indications of vehicles being present or raw magnetometer measurements.

Other devices may also wirelessly communicate with gateway device 315 and use gateway device 315 to communicate with a remote server system. For instance, weather station 320, ATM 325, and vending machine 350 may communicate with gateway device 315 and use gateway device 315 to perform processing functions and/or to communicate with one or more remote server systems.

Gateway device 315 may be electrically connected with an intelligent battery controller device housed within housing 310. In housing 310 may be one or more batteries and an intelligent battery controller device, such as intelligent battery controller device 100 of FIG. 1. The intelligent battery controller device within housing 310 may communicate wirelessly with gateway device 315. The intelligent battery controller device within housing 310 may control the charging and discharging of the one or more batteries within housing 310. The intelligent battery controller device within housing 310 may be connected with a lighting circuit of light 305. The lighting circuit may only be energized when light 305 is on, such as from dusk to dawn. Therefore, the one or more batteries may be charged at night and the one or more batteries may be discharged during the day to power gateway device 315.

Figure 4:
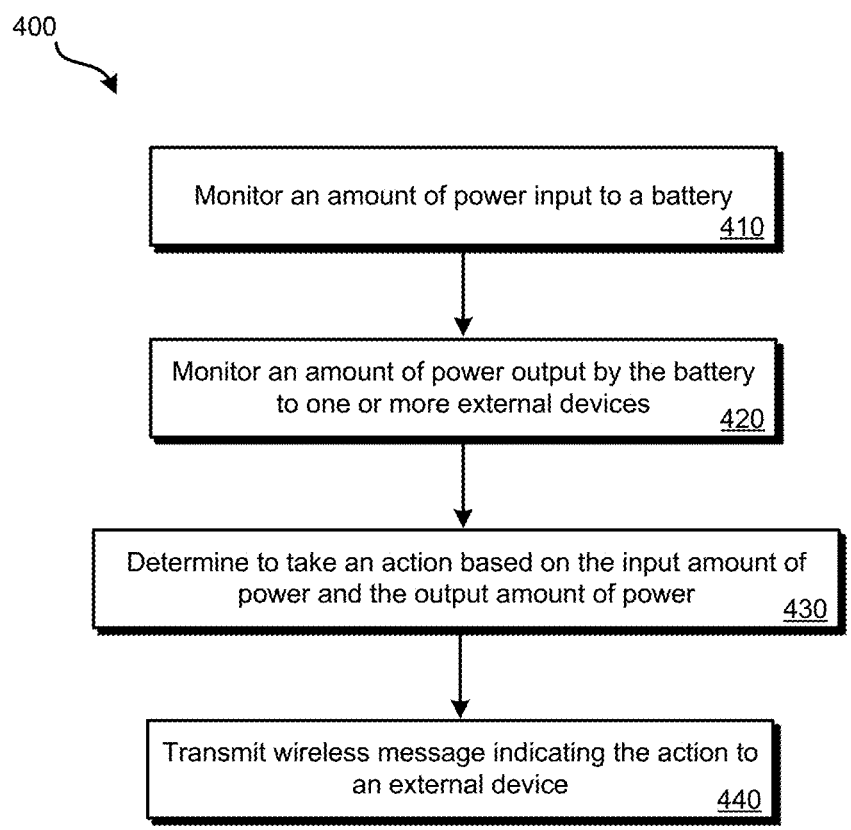
FIG. 4 illustrates an embodiment of a method for performing intelligent battery control.

Various methods may be performed using the systems and devices detailed in relation to FIGS. 1-3. FIG. 4 illustrates an embodiment of a method 400 for performing intelligent battery control. Each block of method 400 may be performed by an intelligent battery controller device, such as intelligent battery controller device 100 of FIG. 1.

At block 410, the amount of power being input to a battery may be monitored by the intelligent battery controller device. The amount of power may be based on a constant voltage and variable current supplied to the battery. The power may be received from an intermittent power source, such as solar panels, a power circuit that is powered only intermittently, or a grid-based power source that occasionally loses power. An indication of the amount of power supplied to the battery may be stored such that a total amount of power provided to the battery can be determined. Based on the amount of power supplied to the battery, accounting for losses, the charge level of the battery can be determined. In some embodiments, in addition or instead of monitoring the amount of power supplied to the battery, the voltage of the battery may be monitored. The output voltage of the battery can be indicative of the charge level.

At block 420, an amount of power output by the battery may be monitored by the intelligent battery controller device. The power may be output to one or more external devices, such as a gateway device or any other device that requires power. The power output may be based on a constant voltage output by the battery and an amount of current that varies based on the draw from one or more external devices. An indication of the amount of power output by the battery may be stored such that a total amount of power output by the battery can be determined. In some embodiments, blocks 410 and 420 may be combined to monitor a net charge flow of the battery. For example, if more power is being drawn from the battery than is being used to charge the battery, the difference between the power being used to charge the battery and power being drawn from the battery may be stored (charging losses may be take into account). In other embodiments, the battery's voltage may be monitored over time.

At block 430, an action may be taken by the intelligent battery controller device based on the monitored power input and the monitored power output by the battery. The net power output or battery voltage level may be extrapolated over time to determine when a maximum net power output value will be reached or a minimum battery voltage level will be reached. A first type of action that can be determined to be taken by the intelligent battery controller device is a notice of shutdown. Based on a rate of decrease in stored charge by the battery measured over a period of time based on blocks 410 and 420, a determination may be made that the battery's stored charge will be discharged to a minimum permissible level and power will cease being output. A time may be estimated when power will no longer be supplied. For example, if the time is within a threshold amount of time, block 440 may be performed to inform one or more external devices. At block 430, a wireless message may be transmitted that indicates: 1) that a shutdown of the battery will occur and no additional power will be output until the battery is at least partially recharged; and 2) an estimated time of the shutdown. Future versions of the wireless message may be transmitted as the estimated time draws near that include updated time estimates of the shutdown.

At block 430, a second type of action that can be determined by the intelligent battery controller device is a power reduction instruction. Based on a rate of decrease in the battery's stored charge as measured over blocks 410 and 520, a determination may be made that the rate of discharge of the battery needs to be decreased in order for the battery to last until a designated time. The designated time may be a time that has been programmed into the intelligent battery controller device or may be based on an average when the battery tends to be recharged (e.g., the power provided by solar panels exceeds the power being discharged, the time at which the intermittent power source tends to be activated, etc.). At block 430, a wireless message may be transmitted to one or more external devices that receive power via the intelligent battery controller device. The wireless message can indicate: 1) that power reduction is required to occur; and 2) the amount of power that the external device is required to use (or the amount of power by which the external device must reduce power consumption). In some embodiments, an external device may not have an ability to directly measure its own power usage. In such embodiments, the external device may deactivate some functions and, after a defined period of time, if the reduced amount of power consumption is insufficient, an updated wireless message may be sent by the intelligent battery monitor device that includes an updated amount of power that the external device is required to use. This process may repeat as many times as necessary until the external device has sufficiently reduced its power consumption as required by the intelligent battery controller device.

A third type of action can be a power decision request. As opposed to a power reduction instruction, a power decision request is an optional action that allows the external device to determine how to proceed. Further detail regarding power decision requests is provided in relation to method 500 of FIG. 5.

Figure 5:
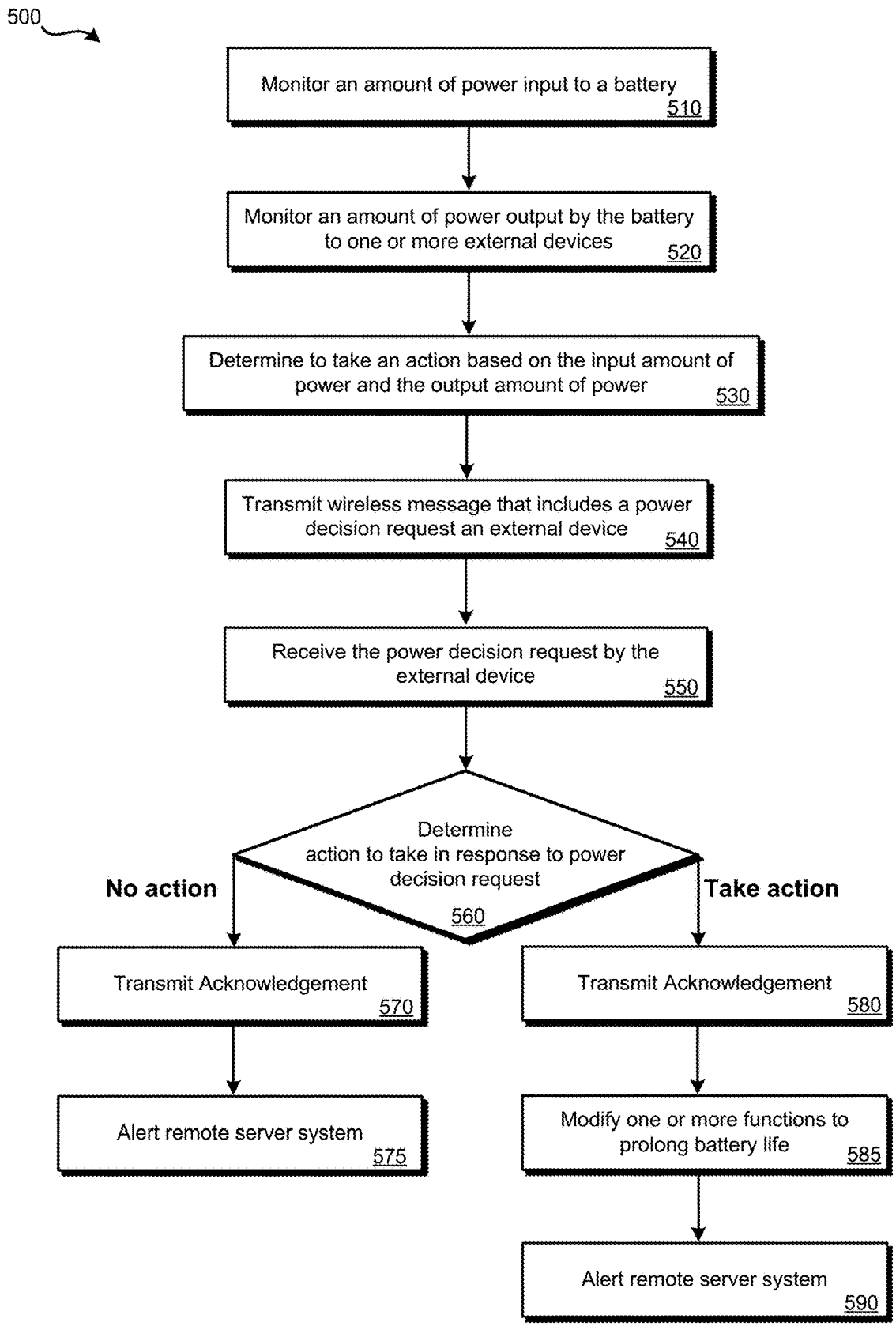
FIG. 5 illustrates an embodiment of a method for performing intelligent battery control using a power decision request message.

FIG. 5 illustrates an embodiment of a method 500 for performing intelligent battery control, using a power decision request message. Each of blocks 510-540 of method 500 may be performed by an intelligent battery controller device, such as intelligent battery controller device 100 of FIG. 1. Method 500 can represent an embodiment of method 400 of FIG. 4.

At block 510, the amount of power being input to a battery may be monitored by the intelligent battery controller device. The power may be received from an intermittent power source, such as solar panels, a power circuit that is powered only intermittently, or a grid-based power source that occasionally loses power. An indication of the amount of power supplied to the battery may be stored such that a total amount of power provided to the battery can be determined. In some embodiments, in addition to or instead of monitoring the amount of power supplied to the battery, the voltage of the battery may be monitored.

At block 520, an amount of power output by the battery may be monitored by the intelligent battery controller device. The power may be output to one or more external devices, such as a gateway device or any other device that requires power. An indication of the amount of power output by the battery may be stored such that a total amount of power output by the battery can be determined. In some embodiments, blocks 510 and 520 may be combined to monitor a net charge flow of the battery. For example, if more power is being drawn from the battery than is being used to charge the battery, the difference between the power being used to charge the battery and power being drawn from the battery may be stored. In other embodiments, the battery's voltage may be monitored over time.

At block 530, an action may be taken by the intelligent battery controller device based on the monitored power input and the monitored power output by the battery. The net power output or battery voltage level may be extrapolated over time to determine when a maximum net power output value will be reached or a minimum battery voltage level will be reached. Multiple types of actions were detailed in relation to method 400 of FIG. 4. An additional type of action is a power decision request. A power decision request provides one or more external devices with options on how power should be managed by the intelligent battery controller device. The power decision request may identify two or more options that can be used by the one or more external devices to make an informed decision. At block 530, a list of power usage and associated shutdown times may be identified. For example, in some embodiments, two options are identified; in other embodiments, three or more options are identified. Table 1 represents an example of four options that have been calculated by the intelligent battery controller device.

TABLE 1

| Power Consumption Adjustment | Estimated Time of Power Disconnect |
| --- | --- |
| No adjustment | 4:27 PM |
| Decrease by 20 W | 6:13 PM |

TABLE 1-continued

| Power Consumption Adjustment | Estimated Time of Power Disconnect |
|---|---|
| Decrease by 30 W | 7:12 PM |
| Decrease by 35 W | No Power Disconnect |

In Table 1, four possible options are determined. One of the options is that no adjustment is performed by the one or more external devices. This option would result in power being unavailable to the one or more external devices the soonest. Additional options are provided that include varying amounts of power consumption being decreased. A final option can include enough of a power consumption decrease that it is estimated that no power disconnect will need to occur. Decreasing by such an amount of power may result in the battery being able to supply enough power until an intermittent power source is likely available to charge the battery or the amount of power being used to charge the battery now exceeds the amount of power being output.

At block 540, a wireless message may be transmitted to one or more external devices. The message can include various power consumption adjustments and estimated times of power disconnect, such as presented in Table 1. In some embodiments, a single master external device may make all power-related decisions that affect all external devices that receive power from the intelligent battery controller device. In other embodiments, all or some of the external devices may receive the message. At block 550, the power decision request message can be received by the one or more external devices. It is not necessary for the external device to provide any form of response to the intelligent battery controller device. That is, the external device can choose to decrease its power consumption or ignore the request.

At block 560, the external device can determine whether or not to take action based on the power decision request. In some embodiments, the external device may access one or more local parameters to determine whether and what action should be taken in response to the power decision request. For instance, particular times of day may be programmed as a priority during which to be operational. Therefore, a power decision may be selected based on ensuring the external device receives power for the priority times of day. Some external devices may be programmed to minimize downtime, therefore, such an external device may attempt to modify its power consumption to prevent a complete power loss, such as in the 35 W reduction of the example of Table 1.

In some embodiments, the external device may not perform the determination. Rather, the power decision request may be forwarded to a remote device. For instance, referring to FIG. 2, the external device (such as a gateway device) may forward the request to a cloud-based server system, which may then respond to the external device and provide an indication of whether an action should be taken.

If the external device determines to take no action at block 560, method 500 may proceed to block 570. In some embodiments, an acknowledgement may be transmitted to the intelligent battery controller device to indicate that the power decision request was received. Data may also be included that indicates that no action will be taken. In such an embodiment, the intelligent battery controller device may transmit future messages that indicate if and when power is expected to be disconnected by the intelligent battery controller device. The external device (and/or the intelligent battery controller device) may transmit an alert to a remote server system at block 575 indicating where the intelligent battery controller device is expected to cease providing power to the one or more external devices. For instance, it may be useful for a remote server system to plan when an external device, such as a gateway device, will no longer be available. In some embodiments, an estimate from the intelligent battery controller device may be provided of when power is expected to be available again.

If the external device determines to take action at block 560, method 500 can proceed to block 580. In some embodiments, an acknowledgement may be transmitted to the intelligent battery controller device to indicate that the power decision request was received. Data may also be included that indicates that action will be taken. In some embodiments, data may indicate the amount of power that the external device intends to use or decrease its power consumption by. In some embodiments, the external device may indicate an amount of power it will attempt to decrease its power consumption by and by future communications, the intelligent battery controller device may provide updates on the external device's progress to the target power consumption.

At block 585, one or more functions of the external device may be modified in order to help prolong the battery life of the battery connected with the intelligent battery controller device. For instance, a speed of processing may be decreased, one or more radios may be disabled or have their transmit power decreased, and/or the external device may intermittently enter a sleep mode.

The external device (and/or the intelligent battery controller device) may transmit an alert to a remote server system at block 590 indicating when the intelligent battery controller device is expected to cease providing power to the one or more external devices. For instance, it may be useful for a remote server system to plan when an external device, such as a gateway device, will no longer be available. In some embodiments, an estimate from the intelligent battery controller device may be provided of when power is expected to be available again. If a shutoff is no longer predicted, a message may be transmitted to the remote server system indicating that power will be maintained indefinitely due at least in part to a decrease in power consumption by one or more of the external devices.

Figure 6:
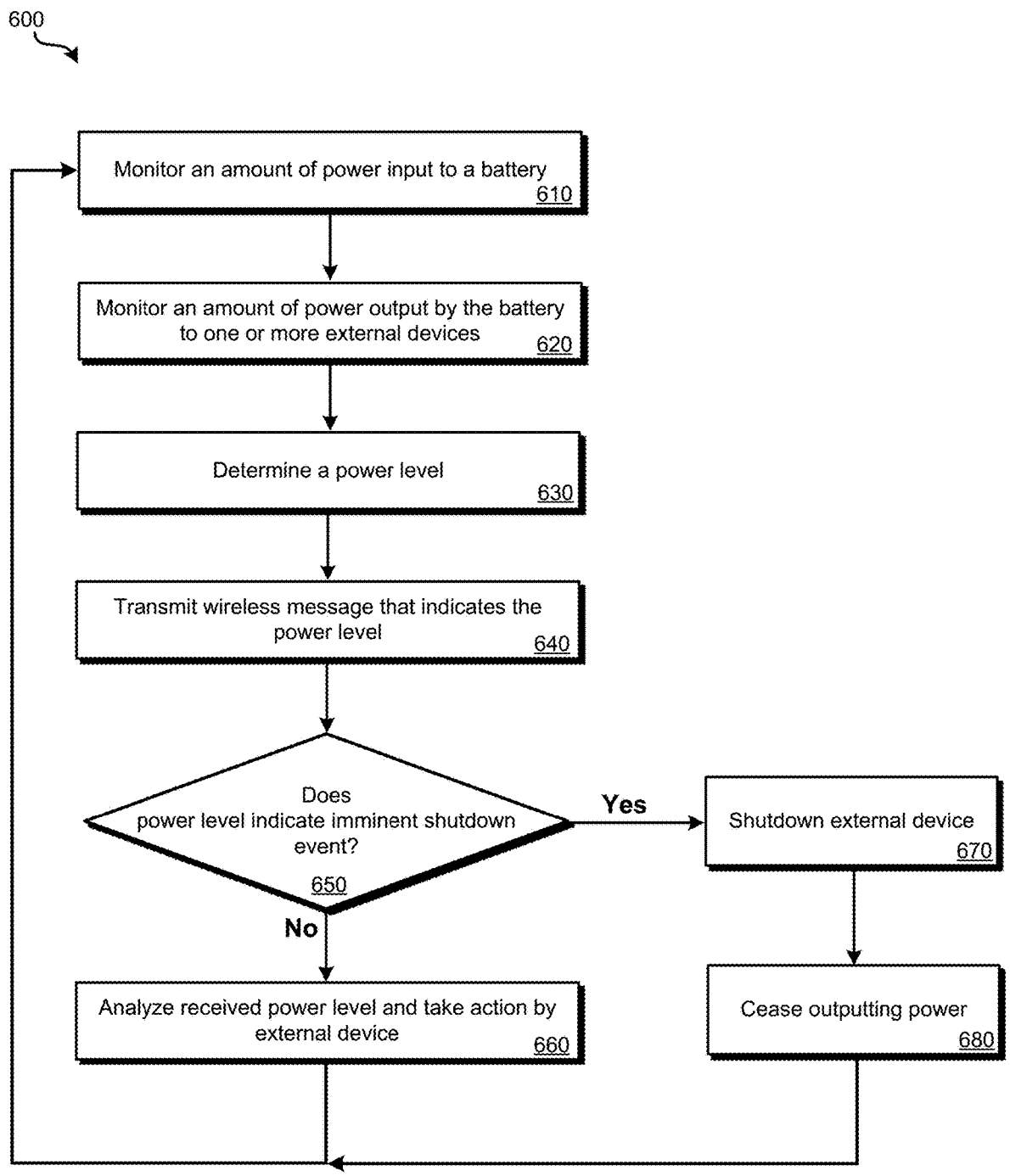
FIG. 6 illustrates an embodiment of a method for performing intelligent battery control using a power level message.

FIG. 6 illustrates an embodiment of a method 600 for performing intelligent battery control using a power level message. Each of blocks 610-640 may be performed by an intelligent battery controller such as intelligent battery controller device 100 of FIG. 1. Blocks 650-680 can be performed by one or more external devices that receive power from the intelligent battery controller and are in communication with the external battery controller.

At block 610, the amount of power being input to a battery (or batteries) may be monitored by the intelligent battery controller device. The power may be received from an intermittent power source, such as solar panels, a power circuit that is powered only intermittently, or a grid-based power source that occasionally loses power. An indication of the amount of power supplied to the battery may be stored such that a total amount of power provided to the battery can be determined. Charging losses may be accounted for. In some embodiments, in addition to or instead of monitoring the amount of power supplied to the battery, the voltage of the battery may be monitored. Monitoring of the charging of the battery may be performed in combination with the battery profile, which can include data indicative of the battery's current capacity.

At block 620, an amount of power output by the battery may be monitored by the intelligent battery controller device. The power may be output to one or more external devices, such as a gateway device or any other device that requires power. An indication of the amount of power output by the battery may be stored such that a total amount of power output by the battery can be determined. In some embodiments, blocks 610 and 620 may be combined to monitor a net charge flow of the battery. For example, if more power is being drawn from the battery than is being used to charge the battery, the difference between the power being used to charge the battery and power being drawn from the battery may be stored. In other embodiments, the battery's voltage may be monitored over time.

At block 630, a power level may be determined by the intelligent battery controller device. The power levels may be as detailed in relation to FIG. 7. At minimum, the power levels may define: a low power level which indicates that shutdown of power being supplied to the one or more external devices will occur after a predefined duration of time; a high power level at which the one or more external devices can operate indefinitely (due to the power being supplied to the intelligent battery controller device exceeding the power output to the one or more external devices) at the current output power level (or a rolling average of the output power level); and one or more power levels between the low and high power levels indicative that the intelligent battery controller device can continue outputting the current (or rolling average) amount of power drawn by the one or more external devices for at least various threshold periods of time, but that the one or more batteries of the intelligent battery controller device are being depleted.

The power level of block 630 may be determined based on a voltage level of the battery or batteries of the intelligent battery controller device. The power level may alternatively be determined based on a coulomb counting method (determining the amount of charge supplied to a battery compared to the charge output).

At block 640, a wireless power level message (or wired communication) may be transmitted that indicates the power level. This message may be encrypted. The message may be received by one or more external devices receiving power from the intelligent battery controller device. In some embodiments, a power level message is sent periodically, such as once every 5 seconds. alternatively, a power level message may be sent occasionally, such as when the power level changes.

At block 650, if the power level is indicative of a shutdown event being imminent (e.g., the low power level), method 600 may proceed to block 570. If, at block 650, the power level is not indicative of a shutdown event (e.g., any other power level), method 600 may proceed to block 660. At block 660, the received power level may be analyzed. An action may be taken by one or more external devices in response to the indicated power level. For example, in order to prolong the power being output by the intelligent battery controller device, the one or more external devices may shutdown one or more accessories or processes in order to decrease power consumption in response to the power level indicated at block 640. Alternatively, based on the power level indicated, the one or more external devices may determine to take no action and continue operating normally. In such a circumstance, the one or more external devices may alternatively take an action when a lower power level message is received. That is, different external devices may be configured to react to power messages differently and at different battery power levels. For example, some external devices may be more aggressive in shutting down functions to prolong battery life than other external devices.

Returning to block 670, if the power level transmitted is indicative of a low power condition and shutdown of the power output being imminent, the external device may execute an orderly shutdown process. The shutdown process may be configured to complete in an amount of time mapped to the low power condition. When the low power condition is indicated in the power level message, the external device may have data stored that indicates an amount of time remaining until power will cease being supplied. Therefore, the external device's shutdown process can be configured to complete in the amount of time. In other embodiments, the power level message may indicate an estimated amount of time remaining. The external device may use this estimated amount of time to determine when and how long to take in performing its shutdown.

At block 680, the intelligent battery controller device may cease outputting power. The intelligent battery controller device may resume charging when power is available. Once sufficient power is available to power devices (at the last known power draw level) for at least a threshold period of time without shutdown being imminent, such as equivalent to power level 2 of FIG. 7, method 600 may return to block 610 and resume outputting power to the one or more external devices.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An intelligent battery controller device, comprising:
   a housing distinct from a battery;
   a power input interface, housed by the housing, that receives power from a power source for storage in the battery;
   a power output interface, housed by the housing, that outputs power from the battery;
   a wireless communication interface housed by the housing;
   a power monitor and control system that monitors: 1) an output power output by the battery to one or more external devices via the power output interface; and 2) an input power received by the battery via the power input interface, the power output monitor and control system housed by the housing, wherein:
      the one or more external devices are connected with the battery via the intelligent battery controller device; and
   a processing system in communication with the power monitor and control system, wherein the processing system is housed by the housing and is configured to:
      based on the output power and the input power, calculate at least three power disconnect options, wherein:
         a first power disconnect option comprises a first estimated time of power disconnect occurs based on no power consumption adjustment being made by the one or more external devices;
         a second power disconnect option comprises a second estimated time of power disconnect that occurs based on power consumption being decreased by a first defined amount of power; and
         a third power disconnect option comprises no power disconnect occurring based on the power consumption being decreased by a second defined amount of power; and
      cause a wireless message to be transmitted to the one or more external devices, the wireless message includes a power decision request that indicates the at least three power disconnect options wherein:
         the one or more external devices select from the at least three power disconnect options.

2. The intelligent battery controller device of claim 1, wherein the power input interface receives a direct current from a solar panel system.

3. The intelligent battery controller device of claim 1, wherein the power input interface receives an alternating current from a lighting system that is not continuously powered.

4. The intelligent battery controller device of claim 1, further comprising a battery profile stored to a non-transitory processor-readable medium that defines operating parameters for the battery, wherein the processing system controls a duty cycle of a square wave for charging of the battery based on the battery profile.

5. The intelligent battery controller device of claim 1, wherein the wireless communication interface performs direct wireless communications with another device without the use of a network hub and the wireless message is encrypted.

6. The intelligent battery controller device of claim 1, further comprising a maximum power point tracker (MPPT) to charge the battery.

7. A method for performing intelligent battery control, the method comprising:
   monitoring an input amount of power supplied by a power source to a battery;
   monitoring an output amount of power output by the battery to one or more external devices;
   based on the output amount of power and the input amount of power, calculating at least three power disconnect options, wherein:
      a first power disconnect option comprises a first estimated time of power disconnect occurs based on no power consumption adjustment being made by the one or more external devices;
      a second power disconnect option comprises a second estimated time of power disconnect that occurs based on power consumption being decreased by a first defined amount of power; and
      a third power disconnect option comprises no power disconnect occurring based on the power consumption being decreased by a second defined amount of power; and
   transmitting a wireless message that includes a power decision request and that indicates the at least three power disconnect options.

8. The method of claim 7, the method further comprising:
   determining, by the one or more external devices, based on one or more factors, whether to decrease power consumption in response to the wireless message; and
   in response to determining, disabling, by the one or more external devices, one or more functions.

9. The method of claim 7, wherein the wireless message is encrypted.

* * * * *